United States Patent
Mecklenburg et al.

(10) Patent No.: US 12,107,473 B2
(45) Date of Patent: *Oct. 1, 2024

(54) ELECTRODYNAMIC DRIVE

(71) Applicant: HILTI AKTIENGESELLSCHAFT, Schaan (LI)

(72) Inventors: Arno Mecklenburg, Berlin (DE); Tilo Dittrich, Feldkirch (AT)

(73) Assignee: HILTI AKTIENGESELLSCHAFT, Schaan (LI)

(\*) Notice: Subject to any disclaimer, the term of this patent is extended or adjusted under 35 U.S.C. 154(b) by 0 days.

This patent is subject to a terminal disclaimer.

(21) Appl. No.: 18/364,364

(22) Filed: Aug. 2, 2023

(65) Prior Publication Data

US 2024/0022157 A1  Jan. 18, 2024

Related U.S. Application Data

(63) Continuation of application No. 16/467,438, filed as application No. PCT/EP2017/081742 on Dec. 6, 2017, now Pat. No. 11,770,061.

(30) Foreign Application Priority Data

Dec. 6, 2016 (DE) .................. 10 2016 014 434.3
Dec. 13, 2016 (DE) .................. 10 2016 014 753.9
Dec. 20, 2016 (DE) .................. 10 2016 015 102.1

(51) Int. Cl.
*H01H 71/43* (2006.01)
*B25C 1/06* (2006.01)
(Continued)

(52) U.S. Cl.
CPC .......... *H02K 41/0354* (2013.01); *B25C 1/06* (2013.01); *B27F 7/11* (2013.01); *H01F 7/081* (2013.01);
(Continued)

(58) Field of Classification Search
CPC ..... B25C 1/06; B27F 7/11; B27F 7/36; B25D 2216/00; H01H 3/222; H01H 33/18
See application file for complete search history.

(56) References Cited

U.S. PATENT DOCUMENTS 1,819,139 A    8/1931  Weibull et al.
3,778,697 A   12/1973  Link et al.
(Continued)

FOREIGN PATENT DOCUMENTS

CN        2877980 Y      3/2007
CN      101277792 A     10/2008
(Continued)

OTHER PUBLICATIONS

"Somaloy 5P Material Data," Buisness Doc Box Website, Available Online at https://businessdocbox.com/Metals/124866387-Somaloy-5p-material-data.html, Available as Early as Feb. 2016, 13 pages.
(Continued)

*Primary Examiner* — Ramon M Barrera
(74) *Attorney, Agent, or Firm* — McCoy Russell LLP

(57) ABSTRACT

The invention relates to a highly dynamic electromagnetic drive in the manner of a Thomson coil with soft-magnetic frame, comprising a first excitation coil (30) whose winding height is greater than its length, which hence is flat; a soft-magnetic frame (10) in which the first excitation coil (30) is arranged and against which it abuts, and which in in the manner of a pot magnet constitutes an open magnetic circuit which includes an outer region (11), a bottom (12) and an inner region (13), and which is open on its end face, wherein the first excitation coil at least partly encloses the inner part (13) of the frame; a short circuit armature (40) preferably formed hollow cylindrical at least on its side facing the first excitation coil (30), which is movably mounted along an axis and which in its stroke starting position dips into the end-face opening of the frame (10) and
(Continued)

thereby at least partly encloses the inner part of the frame (13), wherein the frame (10) entirely or predominantly is formed of a soft-magnetic composite material or one or more sheet stacks, which has a saturation flux density of at least 1.5 T and an effective specific electrical conductivity of not more than $10^6$ S/m, and the first excitation coil (30) and/or the frame (10) include at least one means for strain relief, in particular in the form of an enclosure in order to at least partly absorb at least the radial forces occurring on the first excitation coil (30) during an actuating operation vertically to the direction of movement, and wherein the Lorentz force acting on the short circuit armature is used to perform work.

20 Claims, 7 Drawing Sheets

(51) Int. Cl.
| | |
|---|---|
| *B27F 7/11* | (2006.01) |
| *H01F 7/08* | (2006.01) |
| *H01F 7/16* | (2006.01) |
| *H01H 3/22* | (2006.01) |
| *H01H 3/28* | (2006.01) |
| *H01H 33/38* | (2006.01) |
| *H01H 71/24* | (2006.01) |
| *H02K 33/00* | (2006.01) |
| *H02K 41/025* | (2006.01) |
| *H02K 41/035* | (2006.01) |

(52) U.S. Cl.
CPC ......... *H01F 7/1638* (2013.01); *H01F 7/1646* (2013.01); *H01H 3/222* (2013.01); *H01H 3/28* (2013.01); *H01H 33/38* (2013.01); *H01H 71/24* (2013.01); *H01H 71/43* (2013.01); *H02K 33/00* (2013.01); *H02K 41/025* (2013.01); *B25D 2216/00* (2013.01); *H01F 2007/086* (2013.01)

(56) References Cited

U.S. PATENT DOCUMENTS

| | | |
|---|---|---|
| 6,830,173 B2 | 12/2004 | Barber et al. |
| 8,278,785 B2 | 10/2012 | Schrader et al. |
| 2003/0183670 A1 | 10/2003 | Barber et al. |
| 2009/0236387 A1 | 9/2009 | Simonelli et al. |
| 2015/0306751 A1 | 10/2015 | Bralla et al. |

FOREIGN PATENT DOCUMENTS

| | | |
|---|---|---|
| CN | 104332948 A | 2/2015 |
| GB | 2079381 A | 1/1982 |
| JP | S5662817 U | 5/1981 |
| JP | S5841078 A | 3/1983 |
| JP | 2002034230 A | 1/2002 |
| JP | 20030536353 A | 2/2003 |
| JP | 2004129417 A | 4/2004 |
| JP | 2004510590 A | 4/2004 |
| JP | 2015536834 A | 12/2015 |
| RU | 2508182 C2 | 2/2014 |
| SU | 1093557 A1 | 5/1984 |
| SU | 1249625 A1 | 8/1986 |
| TW | 516995 B | 1/2003 |
| WO | 03005389 A1 | 1/2003 |
| WO | 2015172824 A1 | 11/2015 |

OTHER PUBLICATIONS

"Somaloyl reactor for 30i5p Material Data 3 reactors," Hoganas, Available as early as Jul. 2016, 4 pages. (See NPL 3, Japanese Office Action Issued in Application No. 2019-549656 for Explanation of Relevance).
ISA European Patent Office, International Search Report Issued in Application No. PCT/EP2017/081742, Apr. 10, 2018, WIPO, 6 pages.
Intellectual Property India, Examination Report Issued in Application No. 201917026957, Mar. 9, 2021, 7 pages.
Japanese Patent Office, Office Action Issued in Application No. 2019-549656, Aug. 30, 2021, 12 pages.
Korean Intellectual Property Office, Office Action Issued in Application No. 10-2019-7019000, Aug. 8, 2022, 27 pages.

ELECTRODYNAMIC DRIVE

CROSS-REFERENCE TO RELATED APPLICATIONS

The present application is a continuation of U.S. Non-Provisional patent application Ser. No. 16/467,438, entitled "ELECTRODYNAMIC DRIVE", and filed on Nov. 15, 2019. U.S. Non-Provisional patent application Ser. No. 16/467,438 is a U.S. National Phase of International Patent Application Serial No. PCT/EP2017/081742 entitled "ELECTRODYNAMIC DRIVE," filed on Dec. 6, 2017. International Patent Application Serial No. PCT/EP2017/081742 claims priority to following German Patent Application Nos. 10 2016 014 434.3 filed on Dec. 6, 2016, 10 2016 014 753.9 filed on Dec. 13, 2016, and 10 2016 015 102.1 filed on Dec. 20, 2016. The entire contents of each of the above-referenced applications are hereby incorporated by reference for all purposes.

TECHNICAL FIELD

In various fields of technology pyrotechnical or also pneumatic devices are used, as electromagnetic drives are not eligible in these fields. Exclusion criteria for electric drives include in particular: based on the application, insufficient force and/or working capacity per drive mass or drive volume in highly dynamic electric direct drives such as so-called Thomson coils and railguns also their high wiring expenditure and/or too low efficiency.

BACKGROUND AND SUMMARY

This is illustrated by means of various examples:
nail setting devices, and here in particular hand-held nail setting devices in which e.g. a piston is accelerated due to the combustion of an ignitable gas mixture or a propellant charge, in order to drive in a nail.
arc fault protection devices, in which a pyrotechnically driven metallic bolt breaks through an insulating plate and produces a short circuit in order to withdraw energy from an accidental arc.
short-circuit current limiters in which a pyrotechnical charge destroys a metal tongue, so that the short-circuit current commutes from the path of the metal tongue to a fuse or throttle connected in parallel.

From U.S. Pat. No. 6,830,173 B2 a nail setting device with an electrodynamic drive is known.

The closest prior art is the application WO2015172824 A1 of ABB. The same shows an actuator based on a Thomson coil with a primary coil and with a flux concentrator surrounding the primary coil. The flux concentrator consists of a soft-magnetic or soft-ferromagnetic material, e.g. iron, magnetic steel or a material such as Permadyne.

The object of the invention hence consists in finding a (highly dynamic) electric drive which—as compared with the corresponding prior art—can achieve higher force constants and/or higher electric efficiencies and/or perform higher volume- or weight-specific work.

This object is solved by drive according to claim 1. Preferred aspects of the present invention are subject-matter of the sub-claims.

The present invention comprises an electrodynamic drive, comprising:
a first excitation coil,
a soft-magnetic frame, and
a short circuit armature mounted movably along an axis.

The drive is characterized in that the frame has a saturation flux density of at least 1.0 T and/or an effective specific electrical conductivity of not more than $10^6$ S/m, wherein preferably the first excitation coil and/or the frame include at least one means for strain relief. The saturation flux density is that flux density at which the differential permeability dB/dH of a material becomes equal to the magnetic field constant at which the dimensionless relative permeability $\mu_r$ hence assumes the value $\mu_r=1$ as a result of magnetic saturation.

In particular, this is a highly dynamic electrodynamic drive, in particular constructed in the manner of a Thomson coil with soft-magnetic frame.

In one possible embodiment, the excitation coil has a winding height which is greater than its length, which hence is flat.

In one possible embodiment the excitation coil is arranged in the soft-magnetic frame and abuts against the same.

In one possible embodiment, the frame represents an open magnetic circuit which includes an outer region, a bottom and an inner region, and which is open at its end face, wherein the first excitation coil at least partly encloses the inner part of the frame, and wherein the short circuit armature in its stroke starting position dips into the end-face opening of the frame and thereby at least partly encloses the inner part of the frame.

In one possible embodiment, the short circuit armature therefor is formed hollow cylindrical at least one its side facing the first excitation coil and/or the frame is constructed in the manner of a pot magnet.

In one possible embodiment the soft-magnetic frame entirely or predominantly is formed of a soft-magnetic composite material and/or one or more sheet stacks.

The present invention hence in particular comprises an electrodynamic drive, in particular a highly dynamic electrodynamic drive, in particular constructed in the manner of a Thomson coil with soft-magnetic frame, comprising:
a first excitation coil whose winding height is greater than its length, which hence is flat;
a soft-magnetic frame in which the first excitation coil is arranged and against which it abuts, and which in particular in the manner of a pot magnet represents an open magnetic circuit which includes an outer region, a bottom and an inner region, and which is open at its end face, wherein the first excitation coil at least partly encloses the inner part of the frame;
a short circuit armature preferably formed hollow cylindrical on its side facing the first excitation coil, which is movably mounted along an axis and which in its stroke starting position dips into the end-face opening of the frame and thereby at least partly encloses the inner part of the frame. It is provided that the frame entirely or predominantly is formed of a soft-magnetic composite material or one or more sheet stacks, which has a saturation flux density of at least 1.0 T, preferably at least 1.3 T, particularly preferably at least 1.5 T, as well as an effective specific electrical conductivity of not more than $10^6$ S/m, and the first excitation coil and/or the frame include at least one means for strain relief, in particular in the form of an enclosure.

The strain relief preferably at least partly absorbs at least the radial forces occurring on the first excitation coil during an actuating operation vertically to the direction of movement. In the electrodynamic drive, the Lorentz force acting on the short circuit armature preferably is used to perform work.

In one possible embodiment, that space between outer and inner region of the frame, into which the short circuit armature dips, has the shape of a cylinder jacket, wherein its longitudinal axis corresponds to the direction of movement of the drive and of the winding axis of the coil(s).

In one possible embodiment, the frame made of a soft-magnetic composite material is composed of several parts and/or segments. The several parts and/or segments can be adhesively bonded or potted to each other.

The frame preferably is composed of the several parts and/or segments such that the occurrence of tensile stresses at least is reduced to the effect that breaking of the frame and/or its parts during the operation is avoided.

In one possible embodiment, the short circuit armature of the drive wholly or partly is formed of a non-magnetic material, preferably of an electrically conductive and non-magnetic material, in particular of a curable aluminum alloy.

In one possible embodiment, the short circuit armature on its bottom side, i.e. in the stroke starting position, has a ring of electrically well conducting material, for example copper, on the side of the short circuit armature (40) facing the first excitation coil (30).

Preferably, the ring is embedded into the short circuit armature and in particular into the non-magnetic material of the short circuit armature and/or cohesively and/or positively connected with the short circuit armature.

In one possible embodiment, the specific conductivity of the ring amounts to at least 50% of that of pure copper (% IACS).

The ring for example can be made of pure copper or of a copper alloy or aluminum alloy or a copper-based composite material.

In one possible embodiment, the ring entirely or predominantly has an expansion in direction of movement of at least $l=\sqrt{t \cdot rho/pi \cdot \mu}$, wherein t is the half-value width of the current in the excitation coil during a proper actuating operation, rho is the specific electrical resistance of the ring, pi is the circular ratio and $\mu$ is the magnetic field constant.

In one possible embodiment, the short circuit armature and/or a piston driven by the short circuit armature wholly or partly is formed of a curable aluminum alloy which more preferably is present in a cured state.

In one possible embodiment, the short circuit armature and/or a piston driven by the short circuit armature wholly or partly is formed of a curable aluminum alloy which in the cured state has a specific electrical conductivity of >25% of that of pure copper (% IACS).

In one possible embodiment, the electrodynamic drive is at least partly operated by means of a capacitor discharge. Preferably, for actuating the drive at least one capacitor is discharged via the first excitation coil.

Preferably, the capacitor discharge is accomplished by switching one or more semiconductor switches, wherein the semiconductor switch preferably is a thyristor.

The semiconductor switch can be protected from being damaged during the operation by a saturating inductance connected in series with the same, in that the saturating inductance is dimensioned to sufficiently limit the initial rate of current rise dI/dt.

The drive preferably includes a capacitor assembly with at least one capacitor. The capacitor(s) preferably is(are) one or more electrolytic capacitors and/or foil and/or film capacitors. Preferably, the capacitor assembly comprises at least one foil and/or film capacitor.

The capacitor assembly preferably stores between 0.1 kJ and 10 kJ of energy, more preferably more than 0.3 kJ.

The capacitor assembly preferably has a capacitance between 0.1 mF and 20 mF and/or an electrical series resistance between 0.1 mOhm and 100 mOhm.

In one possible embodiment, the electrodynamic drive can comprise a lifting magnet or be operated on such lifting magnet, wherein during an actuating operation the armature of the lifting magnet, which for example can be formed of a part of the frame, for example of the bottom itself, transmits an impulse to the short circuit armature by means of a chiefly elastic impact in order to accelerate the same, and wherein a capacitor discharge is carried out in synchronism with the elastic impact via the first excitation coil.

In one possible embodiment, the highest voltage applied to the excitation coil during an actuating operation is not more than 600V, preferably not more than 500 V, more preferably not more than 450V. In this case, an electrolytic capacitor preferably is used for operating the drive.

In one possible embodiment, the highest voltage applied to the excitation coil during an actuating operation lies between 1 kV and 2 kV. Thereby, better efficiencies can be achieved. In this case, a foil and/or film capacitor preferably is used for operating the drive.

In one possible embodiment, at least the major part of the frame has an effective specific electrical conductivity of less than $10^5$ S/m, preferably of less than $10^4$ S/m.

In one possible embodiment, the material of the frame entirely or predominantly has a saturation flux density $B_s>1.5$ T, preferably $B_s>1.75$ T, more preferably $B_s>1.9$ T.

In one possible embodiment, the first excitation coil is designed to reduce the influence of the skin effect in that instead of a solid individual conductor the windings are formed in the manner of a strand of several individual conductors insulated against each other, and/or in that a flat wire is used.

In one possible embodiment, the first excitation coil has a copper filling degree of at least 30%, preferably of at least 40%, more preferably of at least 50%, even more preferably of at least 60%.

In particular, the copper filling degree lies between 70% and 85%.

In one possible embodiment, the first excitation coil is potted and by means of a fiber reinforcement additionally strain-relieved against the (Lorentz) forces acting during an actuating operation.

In one possible embodiment, the strain relief is effected in the form of a cylindrical enclosure of the coil with a fiber-reinforced composite material within the outer region of the frame.

In one possible embodiment, the strain relief is formed by an enclosure and preferably consists in an enclosure at least partly surrounding the drive and/or frame around its circumference.

The enclosure preferably is made of a material with a tensile strength of more than 700 MPa, preferably more than 1400 MPa.

In one possible embodiment, a fiber composite material and/or a Maraging steel can be used for the enclosure.

In one possible embodiment, the enclosure has the shape of a hollow cylinder whose axis corresponds with the axis of movement of the drive. The enclosure can be closed on the bottom side, i.e. on the side of the bottom of the frame, for example similar to a pot. Alternatively, the enclosure can be open on the side of the bottom of the frame.

In one possible embodiment, the leads to the first excitation coil are twisted. Alternatively or in addition, the leads to the first excitation coil can be formed of a closed outer and inner conductor in the manner of a coaxial cable, wherein the same need not be designed rotationally symmetrically. In one possible embodiment, the leads to the first excitation coil are formed as flat wires which rest against each other without any substantial clearance, i.e. they or their insulating sheathings touch each other or between themselves define an insignificant gap, in particular air gap. "Insignificant" here is to be understood such that the additional self-induction, which the leads undergo as a result of the gap, is small as compared with the smallest self-induction of the drive, which depends on its operating condition.

In one possible embodiment, the electrodynamic drive includes a cylindrical enclosure which is made of a fiber composite material and comprises a first fabric of carbon fiber, a second fabric of one or more electrically insulating materials, for example glass, HPPE or aramide fiber, as well as a plastic matrix, wherein in the manner of so-called toroidal cores the electrically insulating fabric is used as an insulating intermediate layer between windings of carbon fiber fabric in order to attenuate eddy currents caused by alternating electromagnetic fields.

In one possible embodiment, the electrodynamic drive includes a piston which is driven by the short circuit armature. The short circuit armature therefor can preferably be rigidly connected with the piston and/or be formed integrally with the same. The short circuit armature however can also include a driver by which it acts on the piston formed separate from the short circuit armature.

The front end of the piston can act on a target upon activation of the electrodynamic drive to transmit the work performed by the drive.

Preferably, the piston is shiftably mounted on at least one side, preferably in the region of its front end.

Preferably, the drive includes a resetting device for the short circuit armature and/or the piston, which returns the piston and/or the short circuit armature into a stroke starting position after activation of the drive. Preferably, the resetting device is designed such that in the stroke starting position it exerts a holding force on the piston and/or the short circuit armature. In one possible embodiment, the resetting device operates permanent-magnetically.

In one possible aspect of the present invention, a rear end of the piston goes through an opening in the frame. Preferably, the drive in this case includes a resetting device for the short circuit armature and the piston, which exerts a resetting force on the rear end of the piston.

The piston can be of one-part or multi-part design. In a multi-part design the individual parts are not necessarily, but preferably rigidly connected with each other.

The resetting device preferably is arranged on the side of the frame facing away from the short circuit armature.

The resetting device can include a plain bearing for the rear end of the piston.

Preferably, the resetting force is produced permanent-magnetically.

Preferably, the rear end of the piston is formed of a soft-magnetic material. The rear end of the piston can be fabricated of a sheet stack and/or include slots in order to reduce eddy currents.

Furthermore, the resetting device can include one or more permanent magnets to produce the resetting force. In particular, the resetting device preferably comprises an arrangement of a plurality of permanent-magnetic elements and/or permanent-magnetic regions which form a magnetic circuit which is increasingly closed when the piston is returned, in that the rear end of the piston increasingly moves into a cutout in the arrangement. In particular, the arrangement can have the shape of a hollow cylinder.

The arrangement furthermore can form a Halbach array.

In one possible aspect of the present invention the drive comprises a capacitor assembly and a switch, wherein by closing the switch a discharge of the capacitor assembly is accomplished via the excitation coil, by which the short circuit armature and/or the piston are accelerated out of their stroke starting positions.

The present invention furthermore comprises a nail setting device with an electrodynamic drive as it has been described above. In particular, the electrodynamic drive of the nail setting device comprises an excitation coil, a soft-magnetic frame and a short circuit armature movably mounted along an axis, wherein the frame has a saturation flux density of at least 1.0 T and/or an effective specific electrical conductivity of not more than $10^6$ S/m. Preferably, the excitation coil and/or the frame include at least one means for strain relief.

Preferably, the drive furthermore is designed such as has already been described above in detail.

The term "nail" according to the invention does not require any particular shape. In particular, the term "nail" also comprises bolts, pins, etc. In particular, however, a nail in the sense of the present application is a fastening element with a pin-shaped portion.

In one possible embodiment, the hand-held nail setting device furthermore comprises:
at least one capacitor,
at least one electrochemical energy storage device,
at least one switching converter,
at least one switch,
a piston,
a resetting device for the short circuit armature and the piston,
wherein for setting a nail the capacitor first is charged with electric energy from the electrochemical energy storage device by means of the switching converter, whereupon the switch is closed in order to accomplish a discharge of the capacitor via the excitation coil, whereupon the short circuit armature and the piston are accelerated out of their stroke starting positions, and the piston is used to drive in the nail, and whereafter the resetting device is used to return the piston and the short circuit armature into the stroke starting positions.

In one possible embodiment, the electrodynamic drive during a proper actuating operation has a maximum force density of more than 100 kN/l, preferably of more than 200 kN/l, more preferably of more than 300 kN/l, each based on the volume of the electric drive. The maximum force density is understood to be the quotient of the maximum Lorentz force acting on the short circuit armature and the volume of the electrodynamic drive. The electrodynamic drive comprises and in particular consists of the frame, the winding space of the excitation coil and the part of the short circuit armature dipping into the frame.

Preferably, the volume of the electrodynamic drive therefore is defined as the sum of the volumes of the frame, the winding space of the excitation coil and the part of the short circuit armature dipping into the frame. When the short circuit armature does not dip into the frame, the volume of the electrodynamic drive therefore preferably is defined as the sum of the volumes of the frame and the winding space of the excitation coil.

In one possible embodiment, the electrodynamic drive has a maximum force density at the force maximum during a proper actuating operation.

In one possible embodiment, the hand-held nail setting device is formed such or includes such an additional device that when resetting the drive, i.e. when returning short circuit armature and piston into their respective stroke starting position, a mechanical contact between short circuit armature and first excitation coil is prevented.

Preferably, there is provided an adjustable stop for the short circuit armature and/or piston, in particular in the form of a screw going through the frame. In particular, the frame or a strain relief of the frame serves as a stop.

In one possible embodiment, the setting energy of the nail setting device, in particular the setting energy achievable by charging the one or more capacitors is ≥10 J, preferably ≥100 J, more preferably ≥200 J.

The at least one capacitor preferably is a film capacitor or a foil capacitor.

In one possible embodiment, the hand-held nail setting device includes an electrolytic capacitor or a film or foil capacitor whose housing at least partly is formed by the housing of the setting device itself, the reel of the capacitor hence does not have a complete housing of its own.

Preferably, the housing of the setting device is metallic in the region of the reel and more preferably is made of an aluminum alloy.

In the region of the reel, the housing of the setting device can have a structured surface in particular in the manner of a heat sink.

In one possible embodiment, the electrochemical energy storage device is an accumulator.

In one possible embodiment, the at least one switch is a semiconductor switch, in particular a thyristor.

The present invention furthermore comprises an electric hammer which is driven by an electrodynamic drive as it has been described above.

The present invention furthermore comprises an impact drilling machine whose impact mechanism is driven by an electrodynamic drive as it has been described above, or is formed by such drive.

The present invention furthermore comprises an arc fault protection device with an electrodynamic drive as it has been described above.

In one possible embodiment, the arc fault protection device furthermore comprises at least one electric insulating plate and at least one metallically conducting bolt, wherein the electrodynamic drive(s) according to the invention is/are actuated such that the detection of an accidental arc by external means leads to the fact that the bolt(s) is/are accelerated by the electrodynamic drive(s) in order to break through the insulating plate and accomplish a single- or multi-phase short circuit, so as to withdraw electric power from the accidental arc.

The present invention furthermore comprises an electric switch, in particular power switch, comprising an electrodynamic drive as described above, and which is used to open the electric switch.

The present invention furthermore comprises a short-circuit current limiter comprising such an electric switch. It is provided that as a result of the detection of a short circuit the electrodynamic drive is actuated to open the switch, and that one or more inductances and/or a fuse is/are electrically connected in parallel with the electric switch. The detection of the short circuit can be effected by external means. Such means are known.

The present invention furthermore comprises a hybrid switch for separating a d.c. circuit with a switch as described above, wherein the hybrid switch includes two parallel current paths, wherein a first current path can be interrupted by means of a first semiconductor switch to the effect that the current to be switched off chiefly commutes to the second current path which includes a second semiconductor switch, wherein the first semiconductor switch has a lower breaking capacity and a smaller series resistance than the second semiconductor switch, and wherein the switch according to the invention is connected in series with the first semiconductor switch and in parallel with the second semiconductor switch, wherein the semiconductor switches preferably themselves are composed of several individual semiconductor switches in the form of series and/or parallel connections.

The present invention will now be explained in detail with reference to exemplary embodiments and drawings.

DETAILED DESCRIPTION

Figure 1:
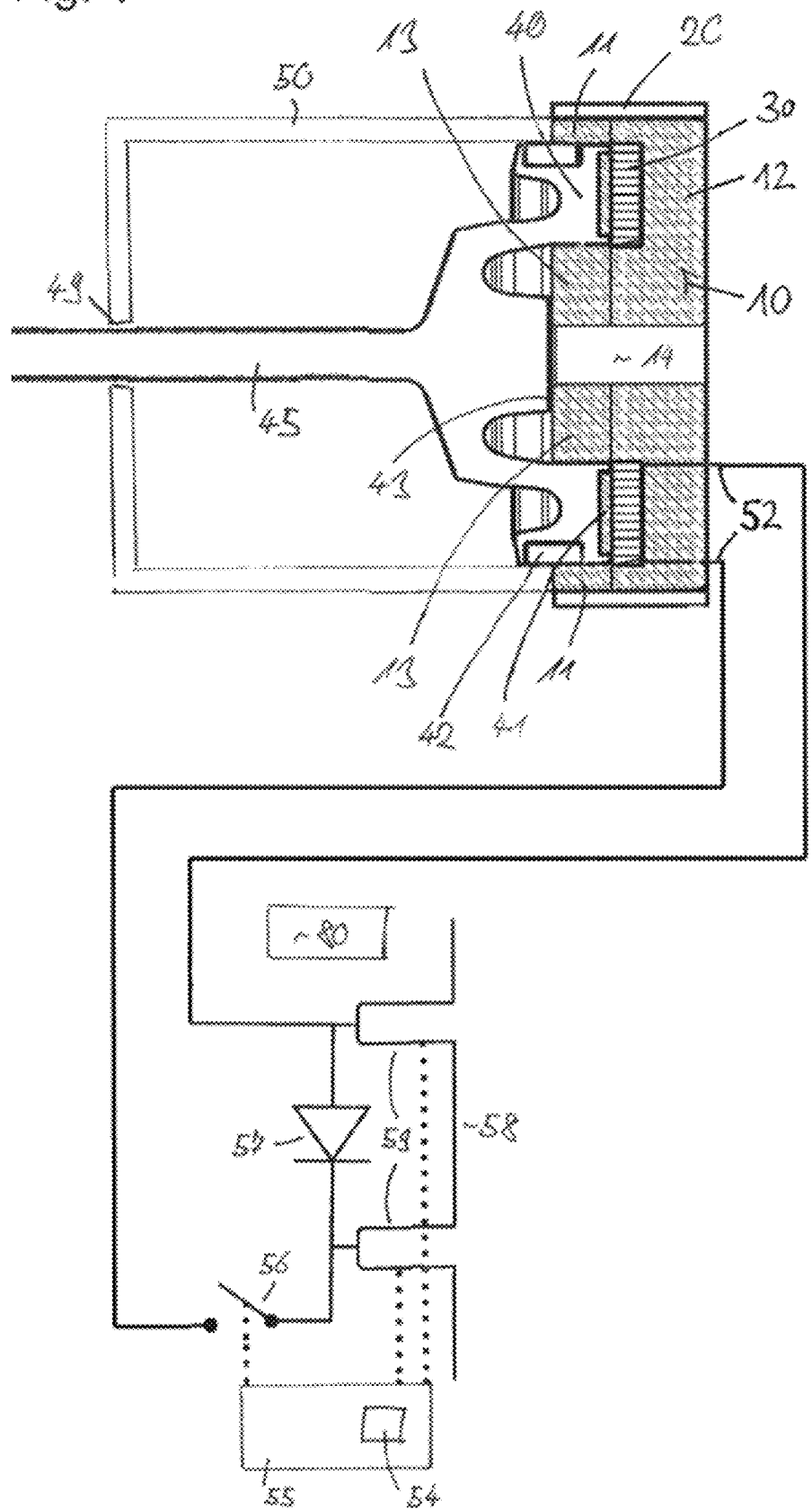
FIG. 1 shows a longitudinal section through a first exemplary embodiment of a drive according to the invention.

The following explanations serve to provide a better understanding of the invention, exclusively are to be regarded as an example and by no means are to be understood in a limiting sense.

In contrast to the above-mentioned concrete application of ABB, the frame (10) formed as a "flux concentrator" in the exemplary embodiment is formed of a soft-magnetic composite material (hereinafter: SMC for "soft-magnetic composite") and/or of one or more soft-magnetic sheet stacks, which has a saturation flux density of at least 1.5 T and an effective specific electrical conductivity of not more than $10^6$ S/m. Preferably, the frame is formed of an SMC with a specific conductivity $<10^4$ S/m, a saturation flux density $B_s \geq 1.9$ T, and a maximum relative permeability $\mu_r \geq 50$. Furthermore, with regard to strength requirements the frame material(s) should be selected to have a high yield point. SMCs well-suited for the realization of the invention are known and available under the brand name Somaloy.

So far, SMCs do not reach the high saturation flux densities of the known magnetic iron-cobalt alloys (e.g. Vacoflux). In view of the high dynamic aimed at by the invention and for which the invention is intended, this fact in most individual cases however is less important by far than the effective attenuation of eddy currents in SMCs.

With the known soft-magnetic alloys (as solid materials), the properties desired according to the invention, such as dynamic and efficiency, cannot be achieved sufficiently.

Another essential aspect of the invention consists in a strain relief of the drive coil(s) and/or of the frame, as the properties desired according to the invention can be achieved only at very high magnetic pressures, which leads to a strong structural strain on the drive in each actuating operation. Beside enclosures (20) made of so-called Maraging steels, for example, in particular fiber composites can also be taken into consideration for a strain relief of the frame (10). For a strain relief of the coil (30) it is possible to pot high-strength fibers or textiles with or wind the same around the electric conductor(s) of the coil. Beside its tensile strength, the fiber material preferably is selected to have a higher tensile modulus than the electric conductor itself. Finally, the coil can be potted or overmolded, wherein the potting compound preferably is selected to on the one hand have a rather high inherent strength, a high yield point, and a high tensile modulus—for a polymer —, and on the other hand to adhere to the electric conductor or to its paint surface as well as to the fiber material itself as firmly as possible. In case the drive is operated under conditions which lead to a significant thermal load of the coil, the potting compound also should be selected to have a high thermal conductivity; for this purpose, the potting compound itself can be filled correspondingly, for example with AN as filler.

The coil possibly can also be equipped with a cooling device, in particular with an active or passive liquid cooling, and/or a firm thermal connection of the coil to the soft-magnetic frame can be provided, which in turn can itself thermally be connected with a heat sink.

Figure 2:
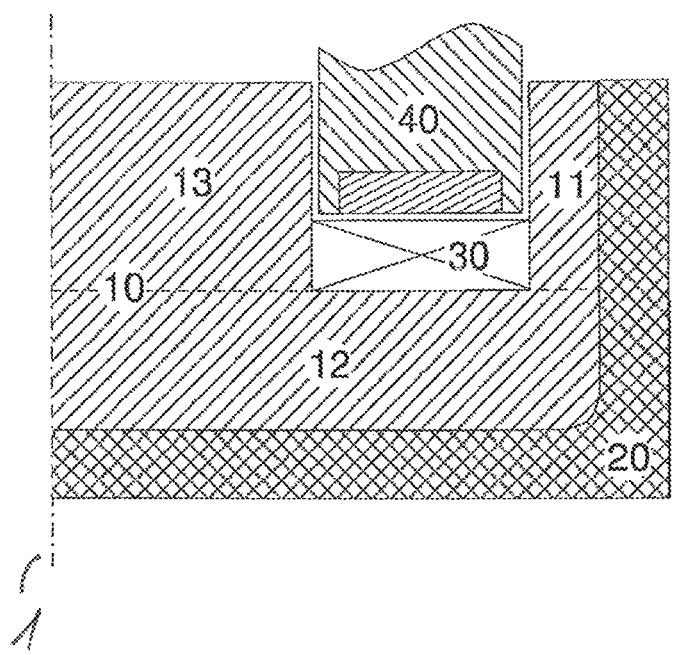
FIG. 2 shows a detail view of a second exemplary embodiment of a drive according to the invention in a longitudinal section, wherein merely one half of the rotationally symmetrical construction is shown.

Finally, the invention will be explained with reference to a concrete example. FIGS. 1 and 2 show longitudinal sections of a first and a second exemplary embodiment of the drive with soft-magnetic frame (10) rotationally symmetrical about the axis (1), which is similar in shape to the frame of known pot magnets, with rounded lower edge, a strain-relieving enclosure of Maraging steel (20), a first excitation coil (30) directly or indirectly abutting against the frame (10), which is formed for example of fiber-reinforced flat wire and which is potted, wherein to control the skin effect each individual winding can be formed in the manner of a strand of several thin (flat) wires connected in parallel, and of the short circuit armature (40) which is made of a high-strength (curable) aluminum alloy (e.g. 7068), and in which on the side facing the coil an electrically excellently conducting ring (41) of (here e.g.) pure Cu is embedded.

Alternatively, it is possible to cohesively or positively connect a ring (41) (of Cu or Al or a Cu alloy or Al alloy with a strength greatly increased as compared to the pure metals, but with a rather good electrical conductivity), which for example has the same inner and outer radius as the remaining short circuit armature (40), with said short circuit armature (40) on its side facing the first excitation coil (30).

The compliance with all strength requirements in the construction of a concrete drive preferably is to be determined for the case of application with the aid of computer simulations (FEM).

In FIG. 1, an enclosure (20) in the form of a cylinder jacket is used as strain relief which surrounds the circumference of the frame (10) along its entire axial length. In FIG. 2, the enclosure (20) on the other hand has a bottom region in addition to the cylinder jacket.

On its outer circumference the short circuit armature has a plain bearing (42) with which the short circuit armature is axially shiftably mounted in a housing (50) of the drive. The short circuit armature (40) is connected with a piston (45) extending in axial direction, which serves the transmission of the forces produced by the short circuit armature. Proceeding from the short circuit armature, the piston extends through the interior of the housing and extends through a piston guide (49). Preferably, the piston (45) also is slidingly mounted.

There is preferably used a device or design which on return of the drive safely prevents (firm) setting of the short circuit armature (40) onto the first excitation coil (30) and hence avoids a possible damage of the coil.

The housing can serve as a shield for the drive in order to fulfill corresponding EMC criteria. Preferably, the housing therefore is fabricated of aluminum and/or an aluminum alloy.

In particular, curable aluminum alloys such as the alloy 7068 can be used in the cured condition, as they combine a high electrical conductivity with a high mechanical strength and sufficient corrosion resistance.

Furthermore, as a shield the drive can include a—preferably thin—outer enclosure of highly permeable soft-magnetic material (e.g. μ-metal) which also should have a high saturation polarization. What can be considered here in particular are foils, clearly superior to μ-metal, of soft-magnetic metallic glasses or nanocrystalline materials with saturation flux densities >1 T (and above all >1.2 T).

In FIG. 1 a surface (43) of the piston (10) or of the short circuit armature (40) facing the frame (10) therefor is designed as a stop by which the position of the short circuit armature in the stroke starting position is defined. The stop (43) can cooperate with the frame (10).

Preferably, the stop (43) however cooperates with an adjusting element by which the distance of the bottom-side end of the short circuit armature (40) or of the ring (41) to the excitation coil (30) can be adjusted in the stroke starting position. For example, a screw can be guided through the bore (14) in the frame (10) and serve as an adjustable counter-stop. It can thereby be prevented that the bottom-side end of the short circuit armature (40) or the ring (41) will damage the excitation coil (30) when it is returned into the stroke starting position.

Figure 3:
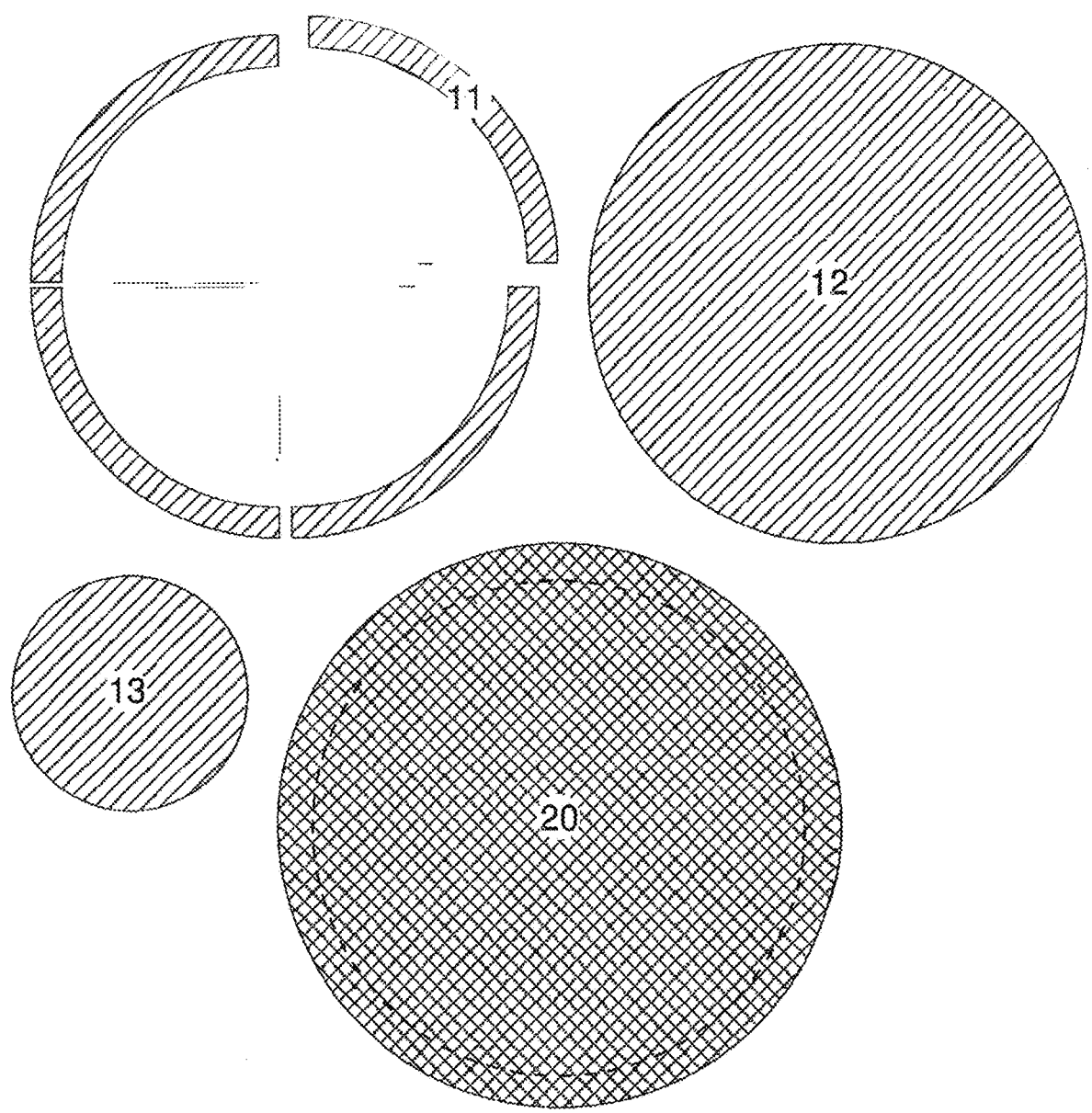
FIG. 3 shows several axial sections through segments of which the soft-magnetic frame is constructed in the exemplary embodiment shown in FIG. 1, FIG. 4a) to d) show another exemplary embodiment of a drive according to the invention with a resetting device.

FIG. 3 shows that the frame (10) can be composed of a plurality of parts (in the outer region of the frame of circular segments); in operation, this provides for a certain movement of the parts against each other, whereby a damage of the comparatively brittle SMC can be avoided. The frame parts likewise are potted or adhesively bonded to each other if possible, wherein a solid elastomer adhering well with high yield point, which is chemically compatible with the SMC, preferably should be selected as potting compound or adhesive.

The electric leads (52) to the first excitation coil (30), which are schematically shown in FIG. 1, should be realized such that the usable magnetic cross-section of the frame is impaired as little as possible by these inevitable leads. For operating the drive, a capacitor or a capacitor bank (58) can be discharged via the excitation coil (30) by means of a switch (56), in particular a thyristor. Furthermore, a freewheeling diode is provided between the connections (59) of the capacitor or the capacitor bank. In particular when foil capacitors and/or film capacitors are used, the same can possibly also be omitted.

A controller (55) actuates the switch (56) and via a switching converter (54) furthermore performs charging of the capacitor or the capacitor bank.

The switch (56) preferably is a semiconductor switch, in particular a thyristor.

To satisfy the weight requirements, the highest demands also are placed on the switching converter. Preferably, the same includes semiconductor switches, in particular semiconductor switches with large band gap (e.g. SiC MOS-FETs) and high-quality core material (above all cores of soft-magnetic metallic glasses and/or nanocrystalline alloys with discrete air gap).

As the self-induction of the coil, which anyway is low in view of the usually very small number of turns, is additionally shorted by the short circuit armature, the initial inductance of the arrangement is extremely low, which provides for the enormous dynamic in the first place. To protect the thyristor from too high a rate of current rise dI/dt, it may be recommendable to introduce a saturating inductance (so-called "saturable reactor"), for example by guiding a lead to the drive through a saturating highly permeable toroidal core ("magnetic switch protection"). Otherwise, the impedances of all components must be taken into account in the design of the outer wiring of the drive according to the invention. The number of turns of the excitation coil is to be adjusted both to the impedance of the voltage source and to the mechanical load, wherein the mechanical load for example is formed by the mass of the short circuit armature and of further parts possibly connected therewith, such as the piston. At a given constant capacity and number of turns, the electric efficiency of a drive according to the invention has a maximum at a particular mass to be accelerated and a mechanical load connected therewith. In many cases, the drive geometry disclosed in the Figures is suitable to directly design a highly dynamic drive for an application in this respect, without having to make an optimization of the same. In general, the drive operates in that the excitation coil (30) first of all repels the short circuit armature (40), wherein the associated "force constants" rapidly decrease with increasing distance, i.e. At given signals the repelling Lorentz force is the greater the smaller the distance between excitation coil (30) and short circuit armature (40). Accordingly, in the stroke starting position the excitation coil (30) and the short circuit armature (40) must be arranged as close as possible to each other.

When electrolytic capacitors are used as capacitors, intense heating of the capacitor can occur during the actuating operation due to the relatively high internal resistance. To remedy this problem it can be provided to switch off the electrolytic capacitors still during the actuating operation. This preferably is accomplished by blocking the semiconductor switch or by a free-wheeling possibility, in particular in the form of a free-wheeling diode.

The ohmic/real internal resistance of the electrolytic capacitor approximately corresponds to that of the coil. It preferably is provided to interrupt the discharge of the electrolytic capacitor after reaching the current maximum, while the electrolytic capacitor still is partly charged and a large part of the electrostatic energy from the electrolytic capacitor has been converted into magnetic field energy in the drive section.

The current linked with the magnetic field furthermore can flow over a rather low-impedance free-wheeling diode or another low-resistance free-wheeling device, which preferably has a lower effective loss resistance than the electrolytic capacitor itself. In this way, magnetic field energy is not unnecessarily converted into heat in the electrolytic capacitor, for example in its electrolytes.

Conventional thyristors cannot be switched off directly. Alternatively, GTOs, IGBTs, IGCTs, MCTs can be used, which can be switched off, but also incur comparatively high costs. What also is possible, however, is a brief reversal of the current direction in the thyristor (SCR1) by means of an in particular comparatively small second thyristor ("auxiliary valve") and a (small) throttle, by at the same time switching off or changing the polarity of the current into the gate of SCR1.

Preferably, however, foil capacitors and/or film capacitors are used, which due to the low internal resistance do not require such switching off.

Foil and/or film capacitors always still have a lower energy density than it can be achieved with electrolytic capacitors, but foil and/or film capacitors can have an extraordinarily low electric series resistance (ESR). This low electric series resistance can considerably increase the efficiency.

Another advantage of foil and film capacitors is to be seen in that they are bipolar. They can bear to be reversed in polarity, so that a free-wheeling diode possibly can be omitted, which due to the related saving in weight is helpful in particular in the case of a hand-held device.

A combination of electrolytic capacitors and foil/film capacitors connected in parallel likewise is possible.

In the foil/film capacitors one balance must be made: Energy density vs. ESR. Here, the optimum (weight/efficiency—depending on the case of application) is to be determined numerically.

The drive still includes a device (80) for returning the piston (45) and/or the short circuit armature (40), which in FIG. 1 merely is shown in abstract form as a box, and will now be explained again by means of an exemplary embodiment with reference to FIGS. 4a to 4d. FIGS. 4c and 4d show the resetting device in a sectional view along the axis of movement of the drive in the two end positions.

The piston return can be effected for example by means of a soft-magnetic element (120) having a spatial extension for example along the direction of movement of the piston by at least one stroke length, which preferably is designed rod-shaped, for example a rod-shaped sheet stack or a soft-magnetic rod with slots. The soft-magnetic element (120) is connected with the piston, preferably rigidly connected, and/or forms the rear end of the piston. The soft-magnetic element preferably extends through an axial opening (14) through the frame and for example is arranged behind the bottom surface of the drive.

In line with the soft-magnetic element an arrangement (100) of permanent magnets (PM) exists, which form a magnetic circuit that is increasingly closed on return of the piston, in that the soft-magnetic element (120) increasingly moves into the arrangement.

The flux of the permanent magnets entirely or predominantly is guided into the soft-magnetic part vertically to the direction of movement. The permanent magnets can be configured in the manner of a so-called Halbach array in order to reduce the otherwise necessary "back iron" and hence save weight and nevertheless provide for a minimum stray field.

Figure 4A:
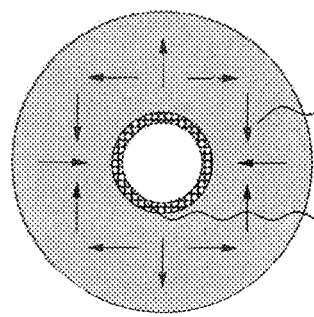
Figure 4B:
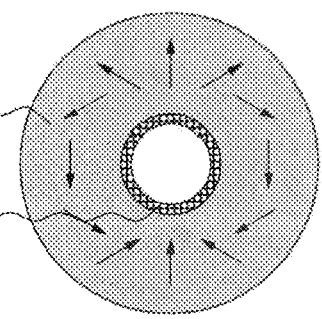
Figure 4C:
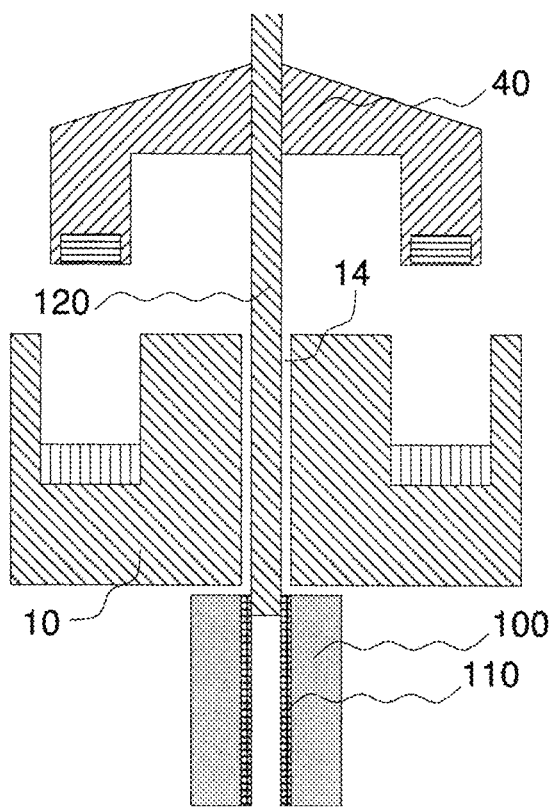
Figure 4D:
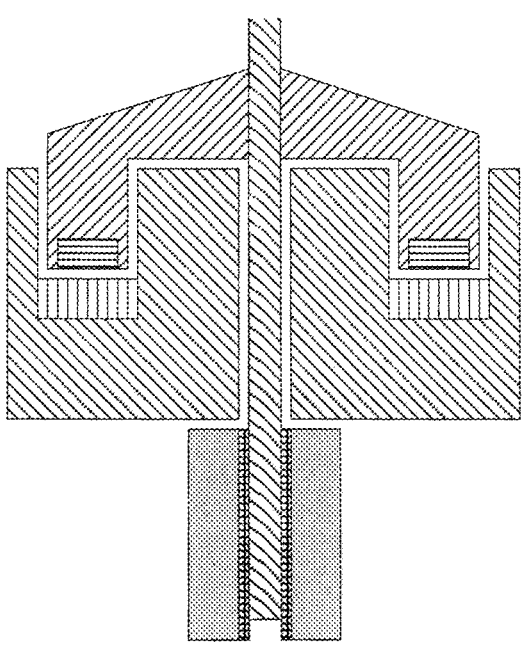

In FIGS. 4a and 4b two different aspects of such arrangements are shown, wherein the arrows indicate the direction of the polarization of the permanent-magnetic elements and/or regions. These are arrangements each in the form of a Halbach array.

With a Halbach array, in particular according to FIG. 4b, it is possible for example to guide the flux generated by the permanent magnets largely transversely through the movable soft-magnetic element (120): Along the direction of movement in a horizontally operated drive the "field lines" thus for example enter into the "iron" from below and exit from the "iron" at the top. Lateral movements of the iron (along the field lines, i.e. orthogonally to the direction of movement) then only lead to a minor change of the magnetic field energy, which is why such an arrangement is almost completely free from magnetic transverse forces, which otherwise might load e.g. bearings, for example a plain bearing guiding the soft-magnetic element.

Figure 5:
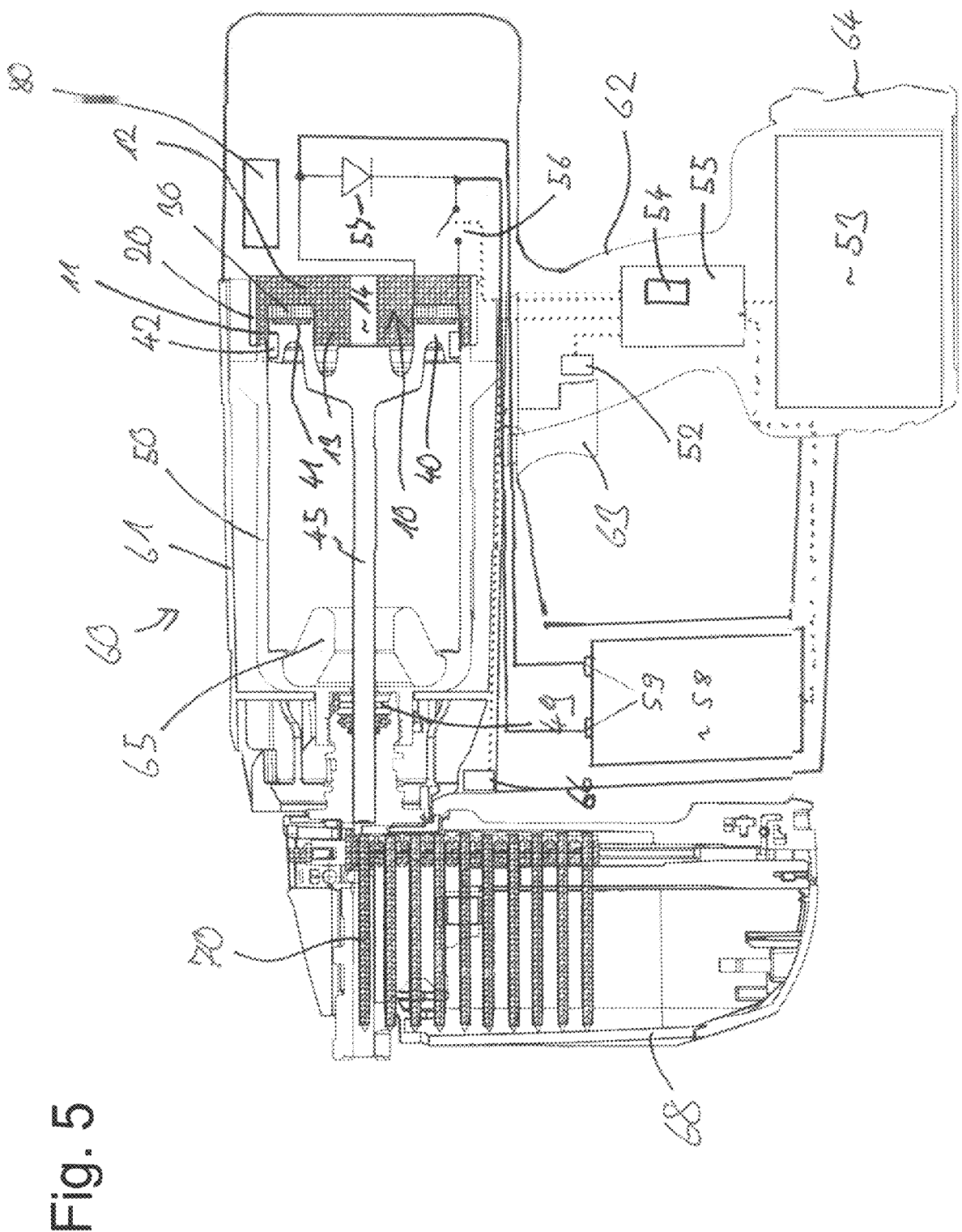
FIG. 5 shows an exemplary embodiment of a nail setting device according to the invention.

Within the arrangement of permanent magnets a plain bearing (110) is provided for the soft-magnetic element. The arrangement of permanent magnets preferably annularly surrounds the soft-magnetic element and/or the plain bearing and/or has the shape of a hollow cylinder. FIG. 5 now shows an exemplary embodiment of a nail setting device according to the invention with a drive according to the invention, as it is shown in detail in FIGS. 1 and/or 4. With regard to the electrodynamic drive reference therefore is made to the above representation.

Beside the components of the drive, i.e. the first excitation coil (30), the soft-magnetic frame (10), the short circuit armature (40) movably mounted along the axis (1) and the strain relief (20), the hand-held nail setting device furthermore comprises at least one capacitor (58), at least one electrochemical energy storage device (53), in particular in the form of an accumulator, a switching converter (54), a switch (56), a piston (45), and a likewise only schematically illustrated resetting device (80) for the short circuit armature (40) and the piston (45). For setting a nail (70) the capacitor (58) first is charged with electric energy from the electrochemical energy storage device (53) by means of the switching converter (54), whereupon the switch (56) is closed in order to accomplish a discharge of the capacitor (58) via the excitation coil (30), whereupon the short circuit armature (40) and the piston (45) are accelerated out of their stroke starting positions, and the piston (45) is used to drive in the nail (70), and whereafter the resetting device (80) is used to return the piston (45) and the short circuit armature (40) into the stroke starting positions.

Driving in the nail is effected by the tip of the piston (45) striking on a nail (70) which for example is provided in a magazine (68) arranged on the front side of the nail setting device.

The nail setting operation is triggered by actuating the trigger switch (52), e.g. by pressing a key (63). The controller (55), however, only allows triggering of a nail setting operation when the tip of the nail setting device has made contact, which is detected via the contact switch (66). The controller (55) queries the contact switch (66) and the trigger switch (52) and actuates the switching converter (54) and the switching converter (56).

The nail setting device (60) furthermore includes a damper (65) which is suitable to absorb the kinetic energy of the piston and possibly prevent a destruction of the device also for the case that the nail can be set without a significant expenditure of work. In the present case, the damper is provided at the outlet of the housing (50).

Beside the drive the housing (61) of the nail setting device furthermore also surrounds the capacitors (58) which in the present case are arranged in the housing in axial direction behind the drive.

The housing can serve as outer housing of the capacitors which therefore do not require their own enclosure. In the region of the capacitors (58) the housing preferably is fabricated of metal in order to ensure a high thermal conductivity and hence a good cooling of the capacitors.

The housing of the nail setting device comprises a handle region (62) on which the key (63) is arranged. The electrochemical energy storage device (53), in particular in the form of an accumulator, preferably is arranged in a separate housing part (64) which is releasably connectable with the remaining housing in order to be able to change the electrochemical energy storage device.

Figure 6:
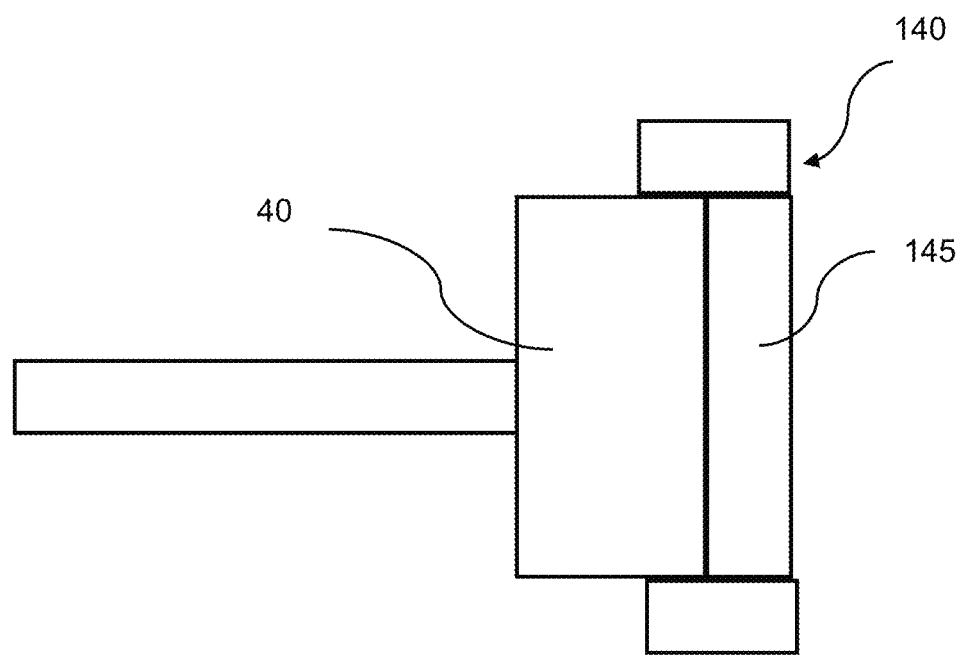
FIG. 6 shows an embodiment of an electromagnetic drive comprising a lifting magnet.

FIG. 6
140 lifting magnet
145 armature of the lifting magnet

FIG. 6 shows an embodiment of an electromagnetic drive comprising a lifting magnet 140, wherein the armature 145 of the lifting magnet 140 transmits an impulse to the short circuit armature 40 during an actuating operation by means of a chiefly elastic impact.

Figure 7:
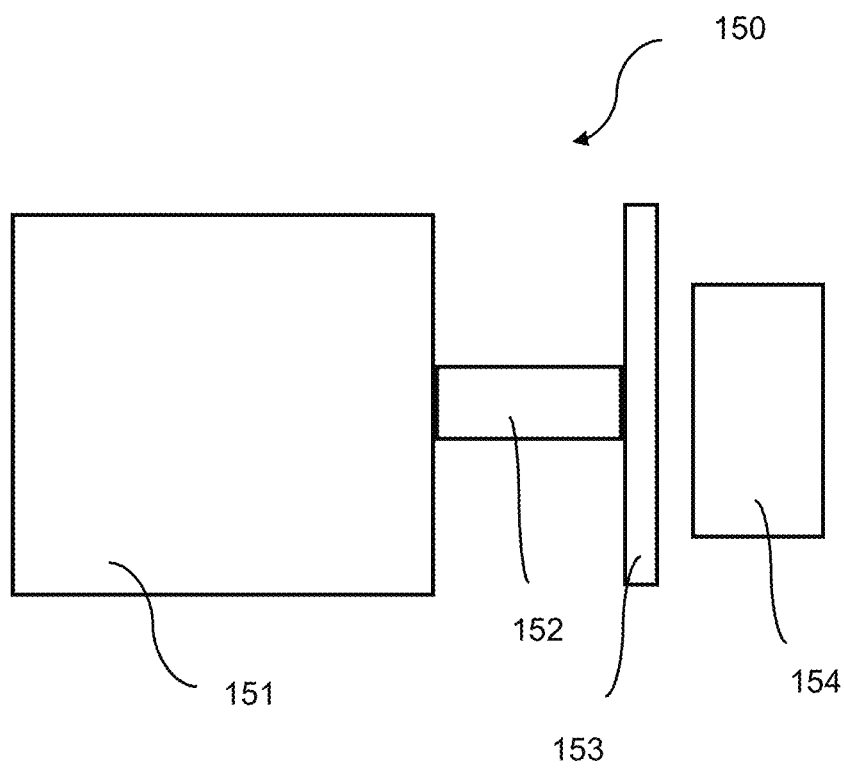
FIG. 7 shows an embodiment of an arc fault protection device comprising at least one electric insulating plate and at least one metallically conducting bolt.

FIG. 7
150 arc fault protection device
153 electric insulating plate
152 metallically conducting bolt
151 electrodynamic drive
154 accidental arc FIG. 7 shows an embodiment of an arc fault protection device 150 which comprises at least one electric insulating plate 153 and at least one metallically conducting bolt 152, wherein the electrodynamic drive(s) 151 is/are actuated such that the detection of an accidental arc 154 by external means leads to the fact that the bolt(s) 152 is/are accelerated by the electrodynamic drive(s) 151 in order to break through the insulating plate 153 and accomplish a single- or multi-phase short circuit, so as to withdraw electric power from the accidental arc 154.

Figure 8:
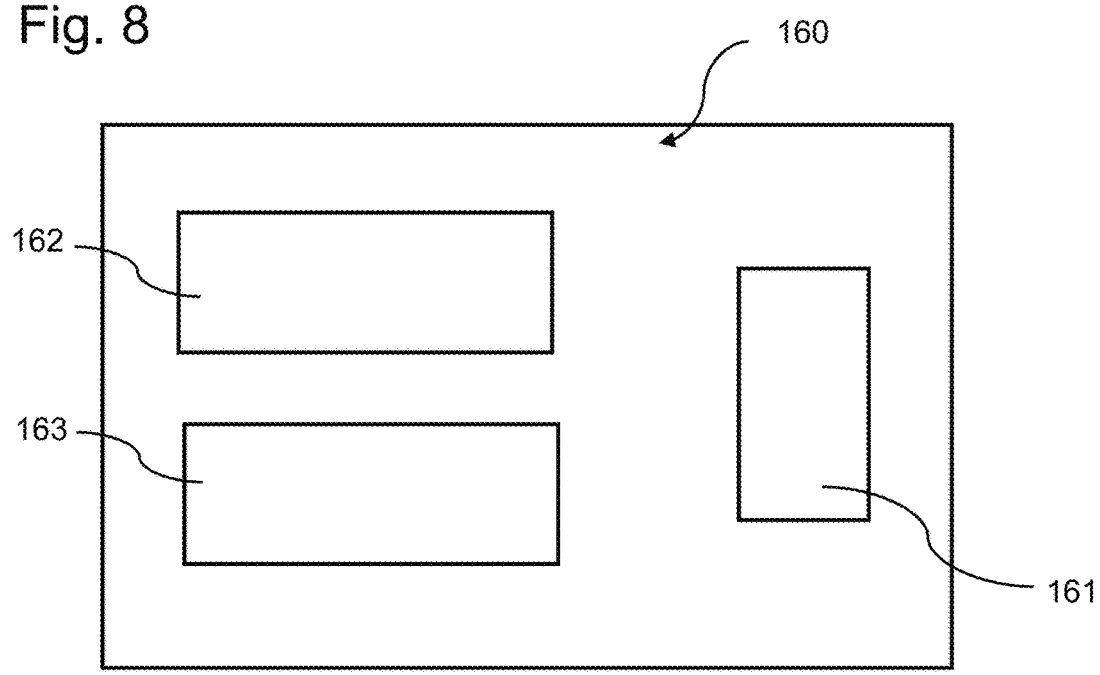
FIG. 8 shows a short-circuit current limiter comprising an electric switch.

FIG. 8
160 short-circuit current limiter
162 electric switch
161 electrodynamic drive
163 inductance/fuse FIG. 8 shows a short-circuit current limiter 160 comprising an electric switch 162, wherein as a result of the detection of a short circuit by external means the electrodynamic drive 161 is actuated to open the switch 162, and that one or more inductances and/or a fuse 163 is/are electrically connected in parallel with the electric switch 162.

Figure 9:
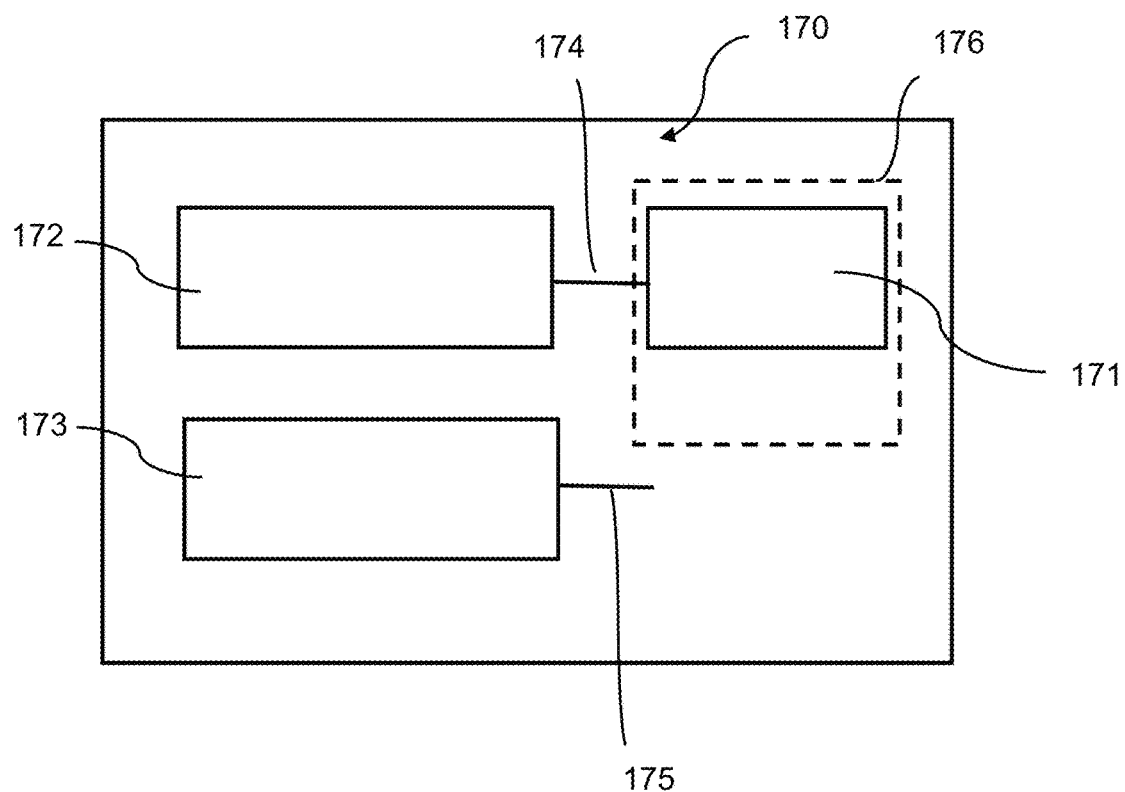
FIG. 9 shows a hybrid switch for separating a d.c. circuit.

FIG. 9
170 hybrid switch
171 switch
174 first current path
175 second current path
172 first semiconductor switch
173 second semiconductor switch
176 d.c. circuit FIG. 9 shows a hybrid switch 170 for separating a d.c. circuit 176 comprising a switch 171, wherein it includes two parallel current paths 174 and 175, wherein a first current path 174 can be interrupted by means of a first semiconductor switch 172 to the effect that the current to be switched off chiefly commutes to the second current path 175 which includes a second semiconductor switch 173, wherein the first semiconductor switch 172 has a lower breaking capacity and a smaller series resistance than the second semiconductor switch 173, and wherein the switch 171 is connected in series with the first semiconductor switch 172 and in parallel with the second semiconductor switch 173.

The invention claimed is:
1. An electrodynamic drive comprising:
a first excitation coil,
a soft-magnetic frame, and
a short circuit armature mounted movably along an axis,
wherein the frame has a saturation flux density of at least 1.0 T and an effective specific electrical conductivity of not more than $10^6$ S/m.

2. The electrodynamic drive according to claim 1, wherein the first excitation coil and/or the frame include at least one means for strain relief, and/or wherein the excitation coil has a winding height which is greater than its length, which hence is flat, and/or wherein the excitation coil is arranged in the soft-magnetic frame and abuts against the same.

3. The electrodynamic drive according to claim 2, wherein the first excitation coil is potted and additionally strain-relieved against the (Lorentz) forces acting during an actuating operation by a fiber reinforcement, and/or wherein the strain relief is effected in a cylindrical enclosure of the coil by means of a fiber-reinforced composite material radially within the outer region of the frame.

4. The electrodynamic drive according to claim 1, wherein the frame represents an open magnetic circuit which includes an outer region, a bottom and an inner region, and which has an end-face opening, wherein the first excitation coil at least partly encloses the inner part of the frame, and wherein the short circuit armature in its stroke starting position dips into the end-face opening of the frame and thereby at least partly encloses the inner part of the frame.

5. The electrodynamic drive according to claim 4, wherein the short circuit armature dips into a space between the outer and inner region of the frame which has the shape of cylinder jacket, wherein its longitudinal axis corresponds to a direction of movement of the drive and/or a winding axis of the coil(s).

6. The electrodynamic drive according to claim 1, wherein the soft-magnetic frame entirely or predominantly is formed of a soft-magnetic composite material and/or one or more sheet stacks.

7. The electrodynamic drive according to claim 6, wherein the frame made of a soft-magnetic composite material is composed of several parts and/or segments which are adhesively bonded or potted to each other.

8. The electrodynamic drive according to claim 1, wherein the short circuit armature of the drive wholly or partly is formed of a non-magnetic material and/or wherein the short circuit armature on the bottom side, i.e. in the stroke starting position, has a ring of electrically well conducting material on the side of the short circuit armature facing the first excitation coil.

9. The electrodynamic drive according to claim 8, wherein the ring entirely or predominantly has an expansion in direction of movement of at least $l=sqrt(t*rho/pi*\mu)$, wherein t is the half-value width of the current in the excitation coil during a proper actuating operation, rho is the specific electrical resistance of the ring, pi is the circular ratio and u is the magnetic field constant.

10. The electrodynamic drive according to claim 1, wherein it at least partly is operated by means of a capacitor discharge.

11. The electrodynamic drive according to claim 10, wherein the capacitor discharge is accomplished by switching one or more semiconductor switches.

12. The electrodynamic drive according to claim 11, wherein the semiconductor switch is protected from being damaged during the operation by a saturating inductance, in that the saturating inductance is dimensioned to sufficiently limit the initial rate of current rise dI/dt.

13. The electrodynamic drive according to claim 1, wherein it comprises a lifting magnet or is operated on such lifting magnet, wherein an armature of the lifting magnet transmits an impulse to the short circuit armature during an actuating operation by means of a chiefly elastic impact in order to accelerate the same, and wherein a capacitor discharge is carried out in synchronism with the elastic impact via the first excitation coil.

14. An electric hammer driven by an electrodynamic drive according to claim 1.

15. An impact drilling machine comprising an impact mechanism driven by an electrodynamic drive according to claim 1 or is formed by such drive.

16. An arc fault protection device comprising an electrodynamic drive according to claim 1.

17. The arc fault protection device according to claim 16, which furthermore comprises at least one electric insulating plate and at least one metallically conducting bolt, wherein the electrodynamic drive(s) is/are actuated such that the detection of an accidental arc by external means leads to the fact that the bolt(s) is/are accelerated by the electrodynamic drive(s) in order to break through the insulating plate and accomplish a single- or multi-phase short circuit, so as to withdraw electric power from the accidental arc.

18. An electric switch comprising an electrodynamic drive according to claim 1, which is used to open the electric switch.

19. A short-circuit current limiter comprising an electric switch according to claim 18, wherein as a result of the detection of a short circuit by external means the electrodynamic drive is actuated to open the switch, and that one or more inductances and/or a fuse is/are electrically connected in parallel with the electric switch.

20. A hybrid switch for separating a d.c. circuit comprising a switch according to claim 18, wherein it includes two parallel current paths, wherein a first current path can be interrupted by means of a first semiconductor switch to the effect that the current to be switched off chiefly commutes to the second current path which includes a second semiconductor switch, wherein the first semiconductor switch has a lower breaking capacity and a smaller series resistance than the second semiconductor switch, and wherein the switch is connected in series with the first semiconductor switch and in parallel with the second semiconductor switch.

* * * * *